(12) United States Patent
Centner et al.

(10) Patent No.: US 8,076,593 B2
(45) Date of Patent: Dec. 13, 2011

(54) APPARATUS AND METHOD FOR SUPPORTING AND SHIELDING A WIRELESS DEVICE

(76) Inventors: David Centner, Great Neck, NY (US);
Burt Faure, Sands Point, NY (US);
Jonathan Schweiger, Weston, FL (US)

( * ) Notice: Subject to any disclaimer, the term of this patent is extended or adjusted under 35 U.S.C. 154(b) by 718 days.

(21) Appl. No.: 12/079,644

(22) Filed: Mar. 28, 2008

(65) Prior Publication Data
US 2009/0248500 A1    Oct. 1, 2009

(51) Int. Cl.
*H05K 9/00* (2006.01)
(52) U.S. Cl. ...................... 174/382; 340/572.8
(58) Field of Classification Search ............... 174/377, 174/382; 361/816, 818; 340/572.8
See application file for complete search history.

(56) References Cited

U.S. PATENT DOCUMENTS

| | | |
|---|---|---|
| 3,231,854 A | 1/1966 | Gran |
| 4,216,857 A | 8/1980 | Huang |
| 4,227,037 A | 10/1980 | Layton |
| 4,312,917 A | 1/1982 | Hawley |
| 4,401,216 A | 8/1983 | Koch |
| 4,567,317 A | 1/1986 | Ehrlich et al. |
| 4,684,020 A | 8/1987 | Ohlbach |
| RE32,772 E | 10/1988 | Hawley |
| 4,896,855 A | 1/1990 | Furnish |
| 5,069,376 A | 12/1991 | Barel |
| 5,097,885 A | 3/1992 | Kitagawa |
| 5,097,949 A | 3/1992 | Heldwein |
| 5,253,162 A | 10/1993 | Hassett et al. |
| 5,310,999 A | 5/1994 | Claus et al. |
| 5,339,222 A | 8/1994 | Simmons et al. |
| 5,483,423 A | 1/1996 | Lewis et al. |
| 5,485,520 A | 1/1996 | Chaum et al. |
| 5,502,912 A | 4/1996 | LeBoff et al. |
| 5,602,919 A | 2/1997 | Hurta et al. |
| 5,677,511 A | 10/1997 | Taylor et al. |
| 5,726,867 A | 3/1998 | Zarreii |
| 5,761,054 A | 6/1998 | Kuhn |
| 5,767,789 A | 6/1998 | Afzali-Ardakani et al. |
| 5,819,234 A | 10/1998 | Slavin et al. |

(Continued)

FOREIGN PATENT DOCUMENTS
JP    2001175899 A    6/2001
(Continued)

OTHER PUBLICATIONS
EZShield.com Web pages (4) EZ Shield LLC (2002).

*Primary Examiner* — Hung Ngo
(74) *Attorney, Agent, or Firm* — Hoffmann & Baron, LLP

(57) ABSTRACT

A receptacle for supporting a transponder on a support structure includes a housing having a first housing portion securable to the transponder and a second housing portion securable to the support structure. The first housing portion is pivotally secured to the second housing portion. The first housing portion and second housing portion include a shield for attenuating the transmission of electromagnetic signals. The first housing portion has a first position wherein the first housing portion and second housing portion form a chamber for enclosing the transponder and restricting the transmission of electromagnetic signals from the chamber. The first housing portion has a second position wherein the first housing portion and the transponder are displaced from the second housing portion thereby opening the chamber and exposing the transponder to permit the transmission of electromagnetic signals to and from the transponder.

23 Claims, 12 Drawing Sheets

U.S. PATENT DOCUMENTS

| | | | |
|---|---|---|---|
| D400,704 S | 11/1998 | Leinberger | |
| 5,850,957 A | 12/1998 | Morris | |
| 5,955,970 A | 9/1999 | Ando et al. | |
| 5,960,572 A | 10/1999 | DeVito | |
| 5,986,562 A | 11/1999 | Nikolich | |
| 6,008,727 A | 12/1999 | Want et al. | |
| 6,104,291 A | 8/2000 | Beauvillier et al. | |
| 6,121,544 A * | 9/2000 | Petsinger | 174/353 |
| 6,127,938 A | 10/2000 | Friedman | |
| 6,342,830 B1 | 1/2002 | Want et al. | |
| 6,390,429 B1 | 5/2002 | Brincat | |
| 6,452,507 B1 | 9/2002 | Friedman | |
| 6,477,370 B1 | 11/2002 | Sigler et al. | |
| D477,909 S | 8/2003 | Harris | |
| 6,617,963 B1 | 9/2003 | Watters et al. | |
| 6,658,775 B1 | 12/2003 | Lanzisero | |
| 6,745,925 B2 | 6/2004 | Brzyski | |
| 6,957,755 B2 | 10/2005 | Mahoney et al. | |
| D525,024 S | 7/2006 | Fridie et al. | |
| 7,080,764 B2 | 7/2006 | McNicholas | |
| D563,331 S | 3/2008 | Rosen et al. | |
| 7,421,245 B2 | 9/2008 | Lieffort et al. | |
| 2003/0057131 A1 * | 3/2003 | Diaferia | 206/719 |
| 2007/0040679 A1 | 2/2007 | Klosinski | |
| 2007/0158378 A1 | 7/2007 | Rafalowitz et al. | |
| 2009/0015376 A1 * | 1/2009 | Xiang et al. | 340/10.1 |
| 2009/0146862 A1 * | 6/2009 | Malone | 342/1 |

FOREIGN PATENT DOCUMENTS

| | | |
|---|---|---|
| JP | 2001195622 A | 7/2001 |
| JP | 2006076368 A | 3/2006 |

* cited by examiner

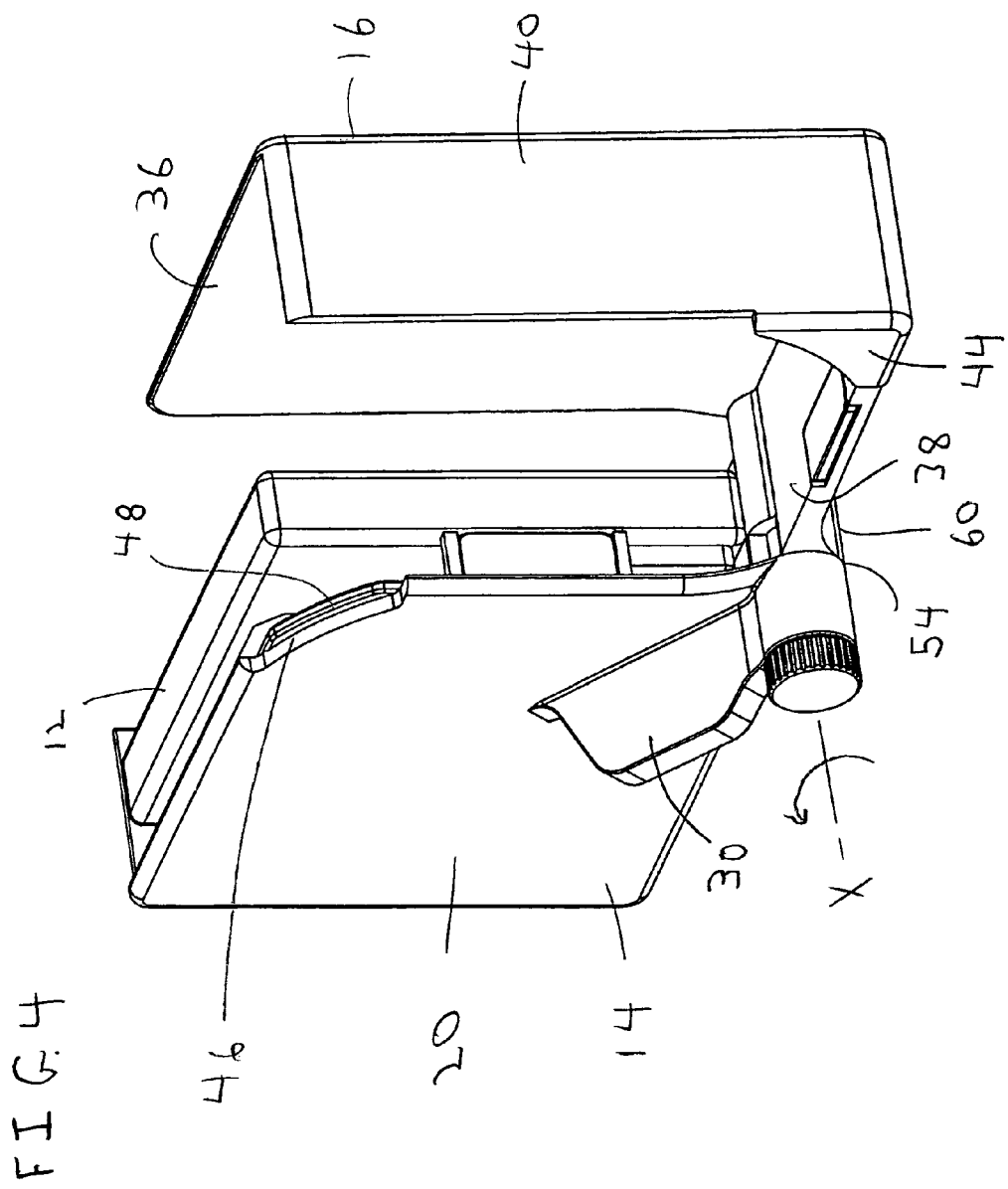

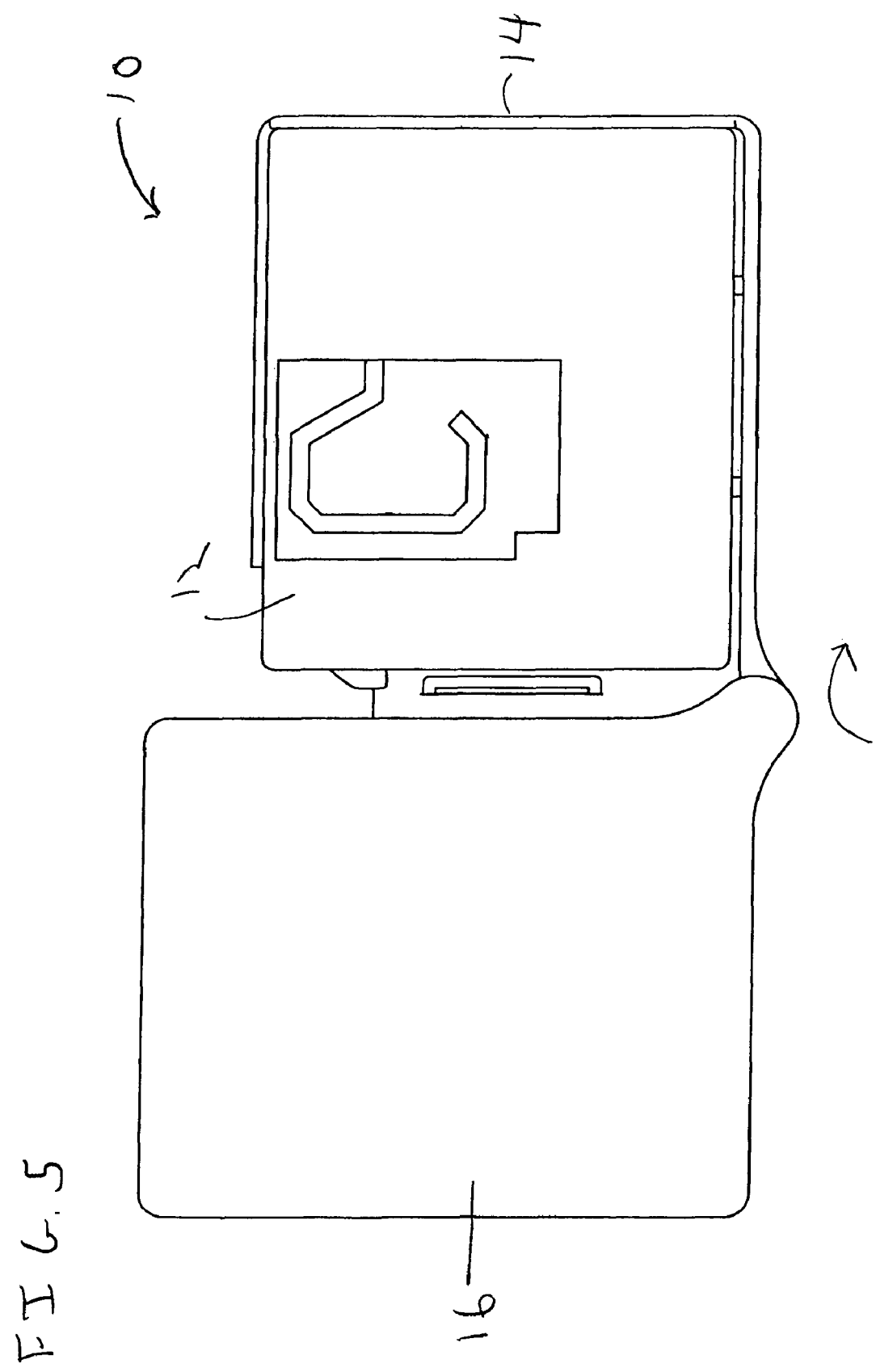

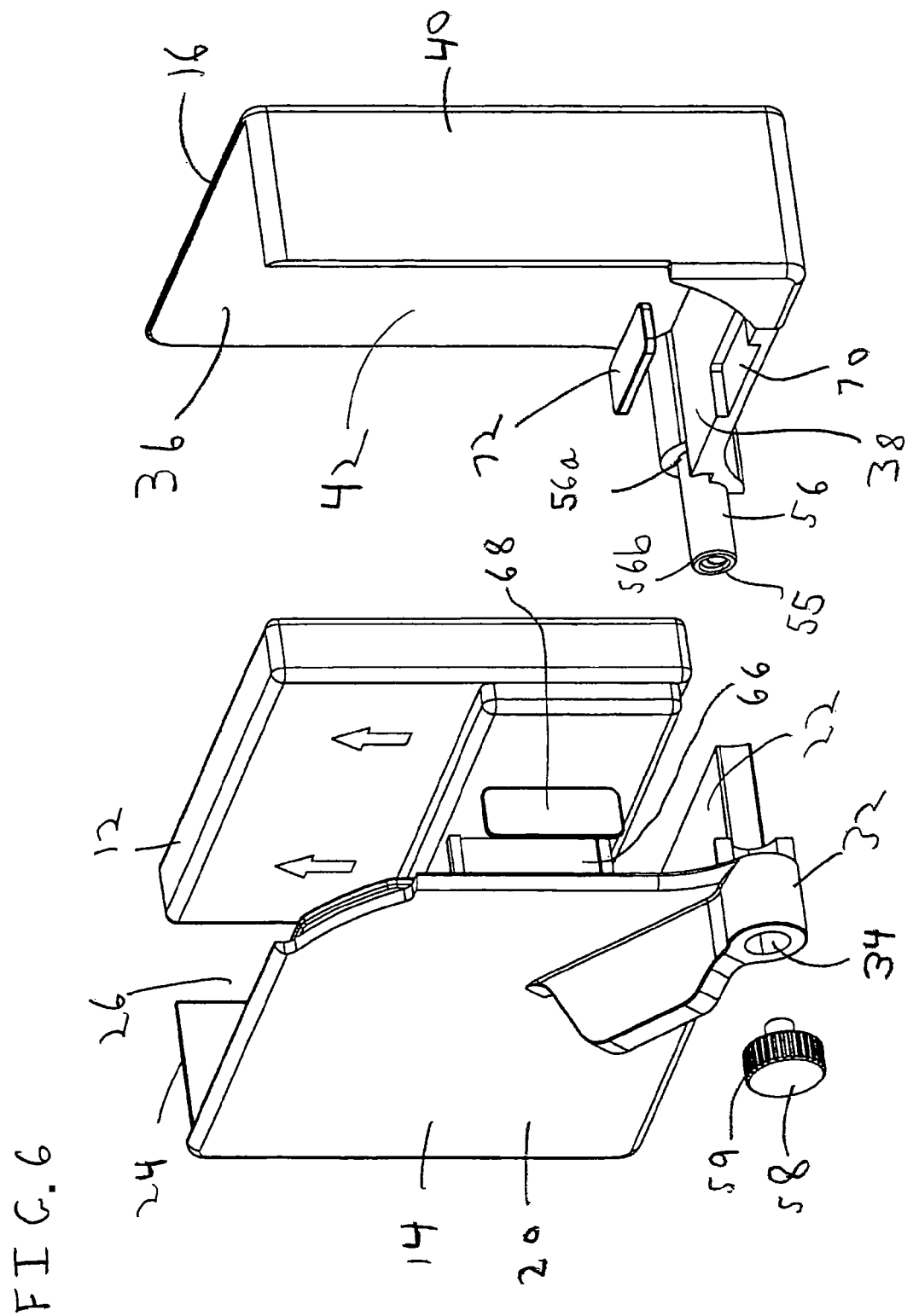

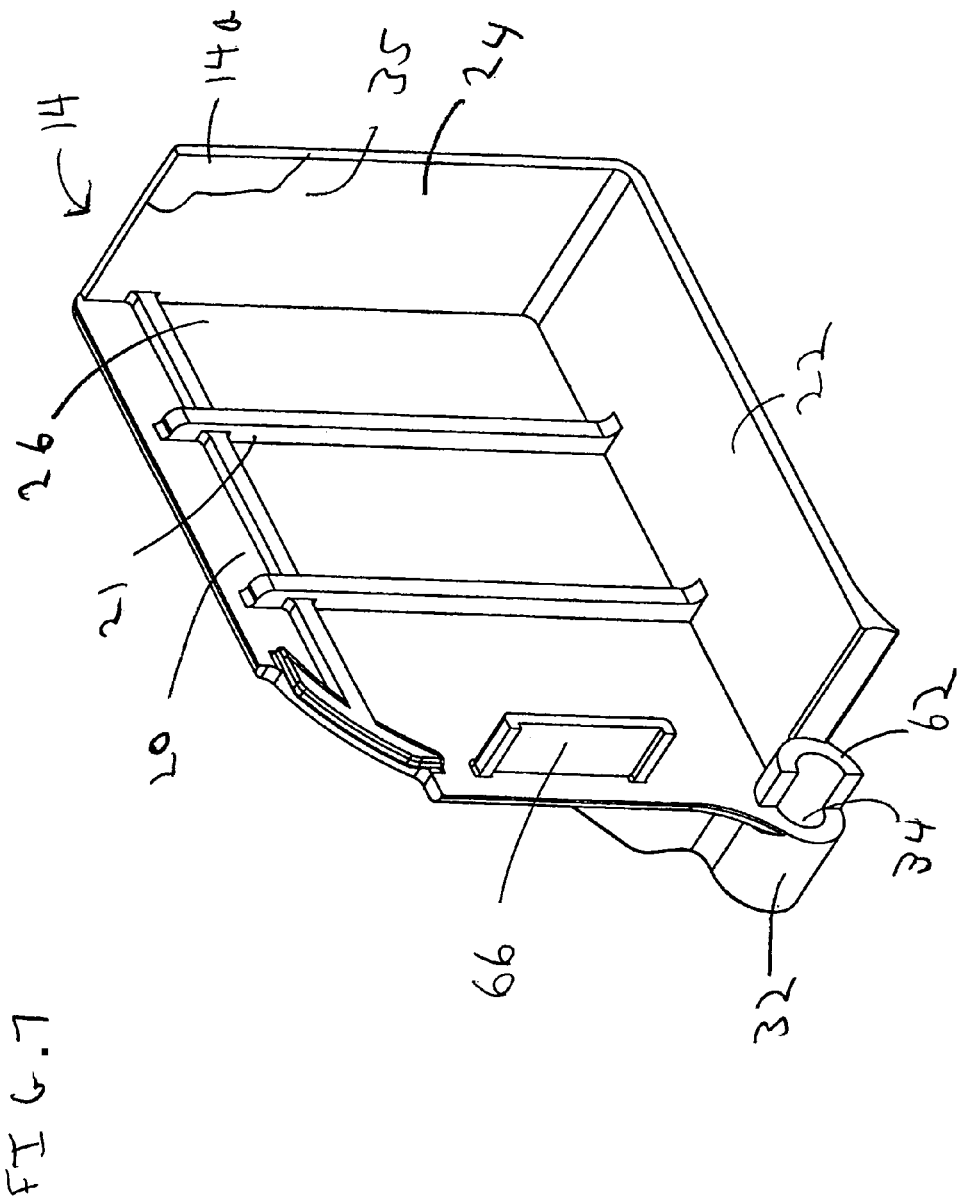

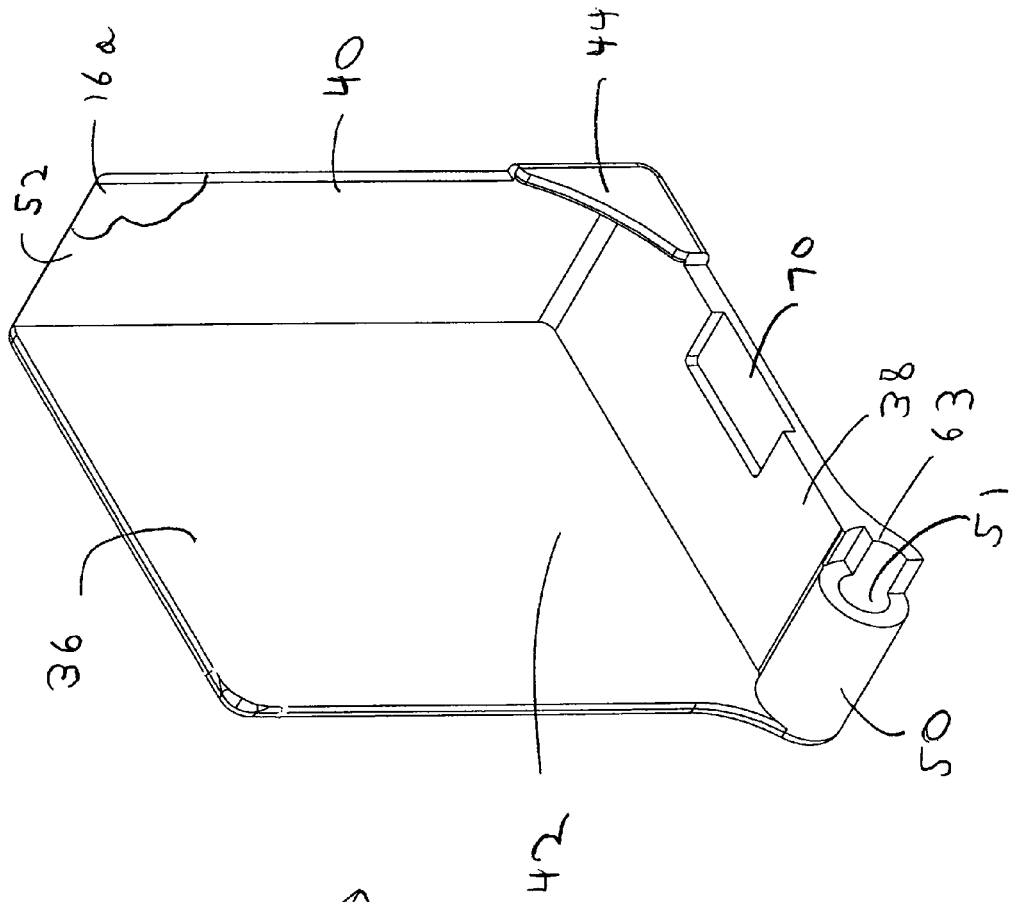

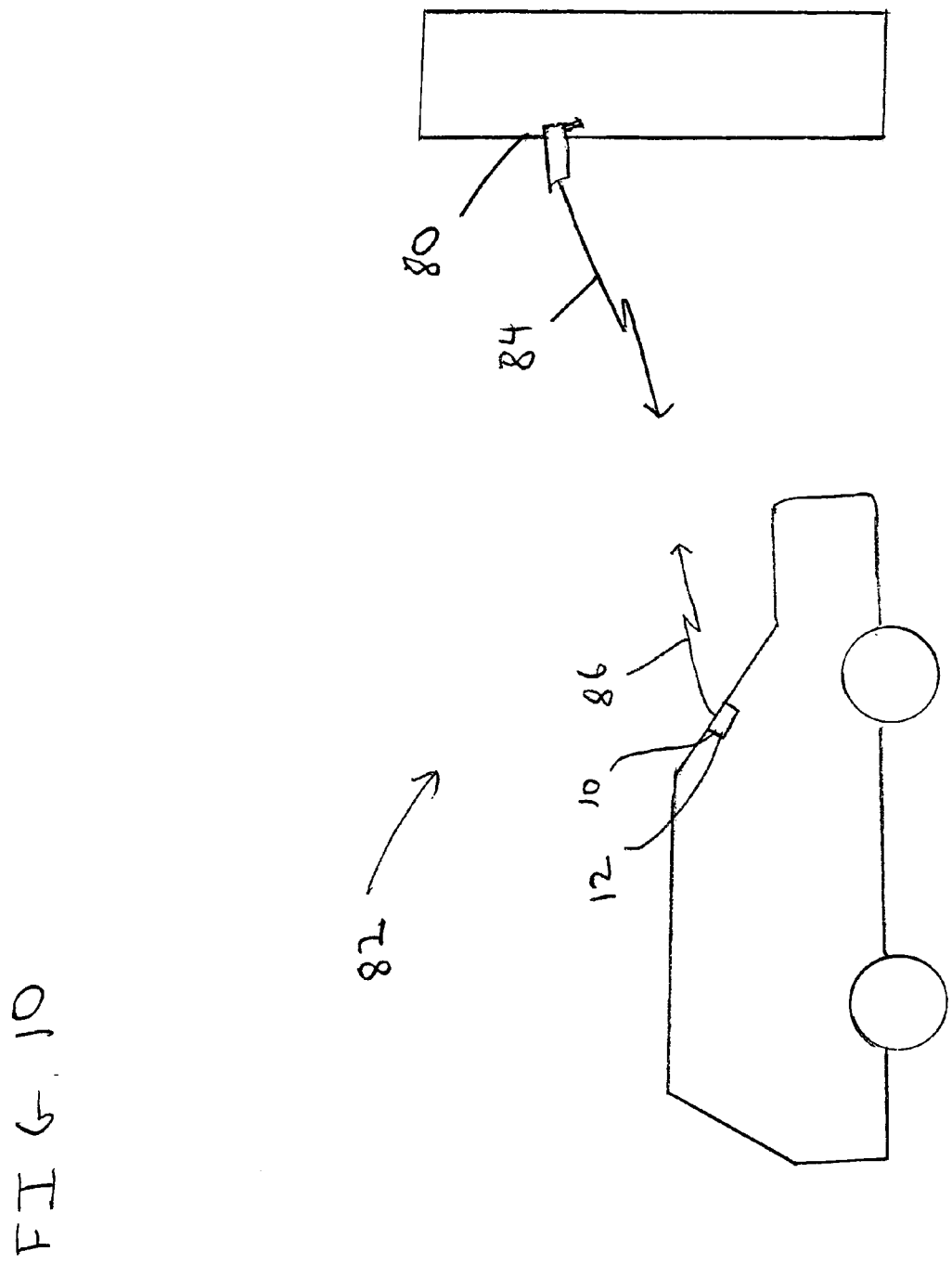

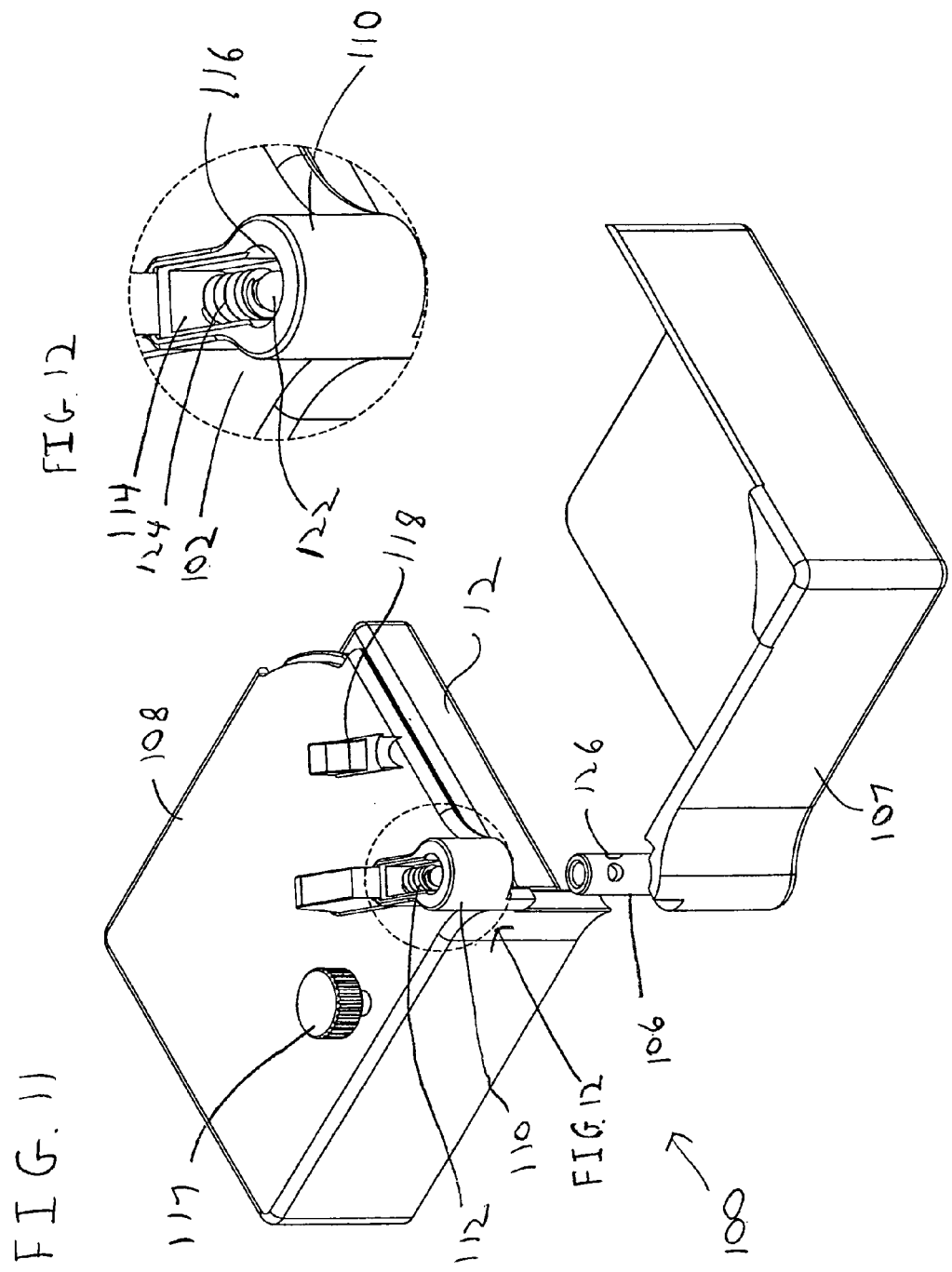

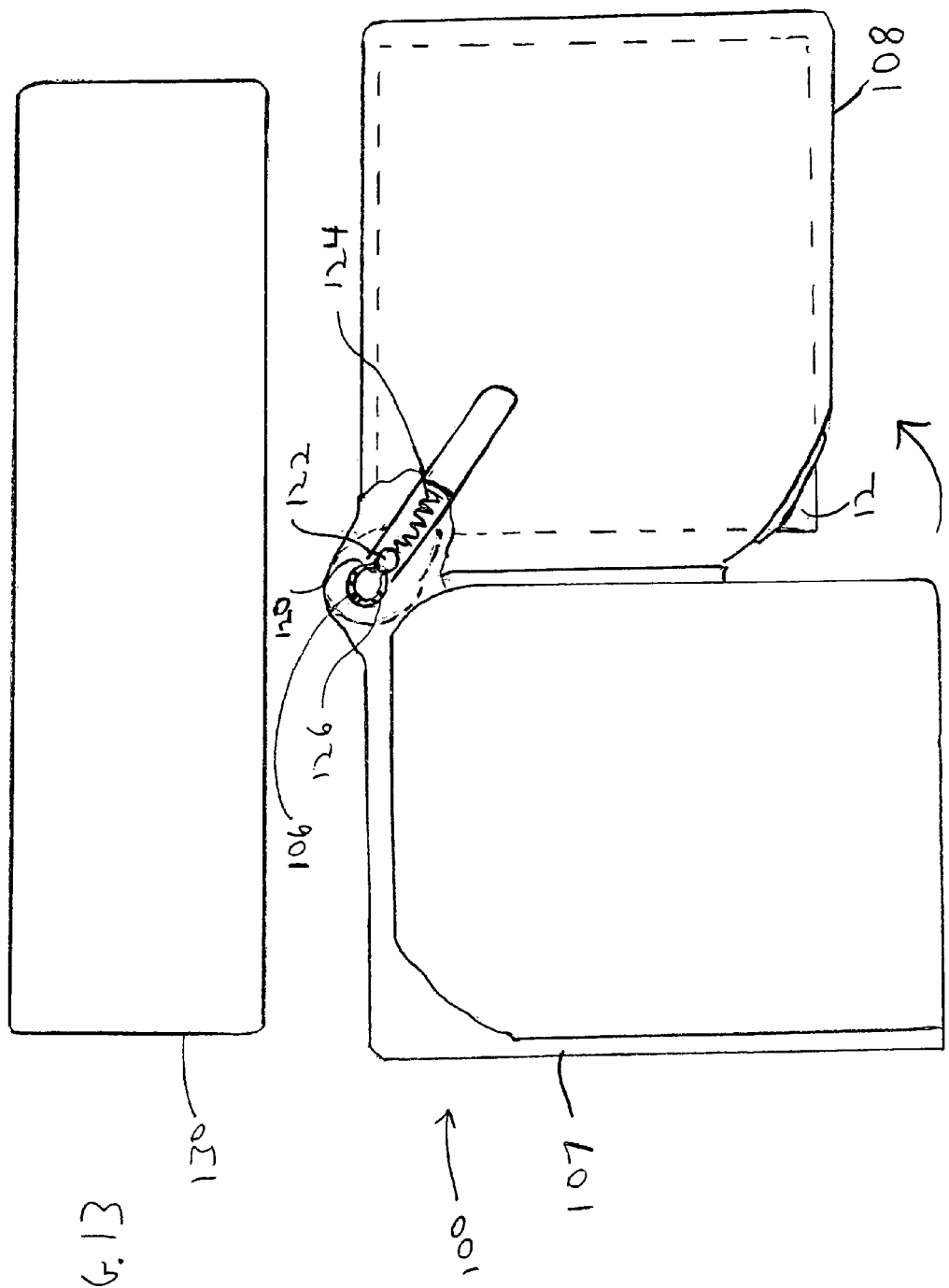

APPARATUS AND METHOD FOR SUPPORTING AND SHIELDING A WIRELESS DEVICE

FIELD OF THE INVENTION

The present invention relates to an apparatus for supporting a wireless device, and more particularly a receptacle for supporting a transponder and providing shielding thereof.

BACKGROUND OF THE INVENTION

The use of electronic toll collection systems is becoming evermore popular as a way of managing traffic volume through toll collection points. Such systems typically include a reader at the toll station which interrogates a wireless payment device located on a vehicle. The payment device may be a transponder, such as an RFID (radio frequency identification device). Upon interrogation by a reader, the transponder emits a radio frequency signal that includes information corresponding to an account code unique to the transponder. Therefore, the user can be properly charged for going through the toll. Such transponders are marketed by Mark IV Transportation Technologies Group and TransCore. The transponders operate with toll collection systems such as E-ZPASS® and SunPass®. In order to function properly, the transponder must be in radio frequency ("RF") communication with the interrogator. If this communication is interrupted, the transponder will not be acknowledged. Therefore, the transponder is typically located on the windshield or other part of the vehicle where it is unobstructed by the metal body of the vehicle.

At times it may be desirable for a driver of a vehicle to pay for the toll directly and not rely upon the payment device in the vehicle. For example, if the driver has rented the car from a rental company, the driver may prefer to pay the toll themselves as opposed to relying on the transponder provided with the rental car.

Accordingly, it would be desirable to provide a receptacle for supporting a wireless device which permits it to be easily prevented from communicating with another device.

SUMMARY OF THE INVENTION

The present invention provides a receptacle for supporting and shielding a wireless device.

The present invention further provides a receptacle which includes a first housing portion and a second housing portion rotatably secured to each other.

The present invention provides a receptacle for supporting a wireless device on a support structure including a housing having a first housing portion securable to the wireless device and a second housing portion securable to the support structure. The first housing portion is pivotally secured to the second housing portion. The first housing portion and second housing portion include a shield for attenuating the transmission of electromagnetic signals. The first housing portion has a first position wherein the first housing portion and second housing portion form a chamber for enclosing the wireless device and restricting the transmission of electromagnetic signals from the chamber. The first housing portion has a second position wherein the first housing portion and the wireless device are displaced from the second housing portion, thereby opening the chamber and exposing the wireless device to permit the transmission of electromagnetic signals to and from the wireless device.

The present invention further provides a receptacle for retaining an automatic toll payment device to a vehicle including a housing having a first portion fixedly secured to the payment device. A second housing portion is fixedly securable to the vehicle. The first portion is rotatably secured to the second portion. The first and second portions form a chamber for enclosing the payment device when the first portion is in a closed position. The first and second housing portions include a shield for restricting the transmission of signals to or from the payment device when the first portion is in the closed position and permitting the transmission of signals when the first portion is in an open position.

The present invention further provides a method of affecting the operability of a toll payment device including the steps of:
providing a housing including a first portion and a second portion, the first portion being rotatably secured to the second portion, the first and second portions forming a chamber for enclosing the payment device when the first portion is in a closed position, the first and second housing portions including a shield, the shield restricting the transmission of signals to or from the payment device when the first portion is in the closed position;
securing the second housing portion to a vehicle;
securing the payment device to the first housing portion;
rotating the first housing portion to a closed position to prevent operation of the payment device; and
rotating the first housing portion to an open position to open the chamber to permit operation of the payment device.

The present invention also provides an electronic toll collection system including an interrogator for emitting a first electronic signal. A transponder is disposed on a vehicle and adapted to wirelessly communicate with the transponder. The transponder is capable of emitting a second electronic signal in response to receipt of the first electronic signal. A transponder receptacle is provided for supporting the transponder on the vehicle. The receptacle has a first portion fixedly secured to the transponder. The receptacle further includes a second portion, and the first portion is rotatably secured to the second potion. The first and second portions form a chamber for enclosing the payment device when the first portion is in a closed position. The receptacle first and second portions include a shield for restricting the wireless communication between the transponder and the interrogator when the first portion is in the closed position and permitting the wireless communication between the interrogator and the transponder when the first portion is in the open position.

BRIEF DESCRIPTION OF THE DRAWINGS

FIG. 4 is a perspective view of the receptacle in the open position.

FIG. 5 is a front elevational view of receptacle in the open position.

FIG. 6 is a perspective exploded view of the receptacle of FIG. 1.

FIG. 7 is a perspective view of the inside of a first housing portion.

FIG. 8 is a perspective view of the inside of the second housing portion.

FIG. 10 is a schematic representation of a system of the present invention.

FIG. 11 is an exploded perspective view of an alternative embodiment of a receptacle of the present invention.

FIG. 12 is a detail view of a hinge of FIG. 11.

FIG. 13 is a top plan view of the receptacle in FIG. 10 in the open position with a portion removed to show detail.

DETAILED DESCRIPTION OF THE PREFERRED EMBODIMENTS

Figure 1:
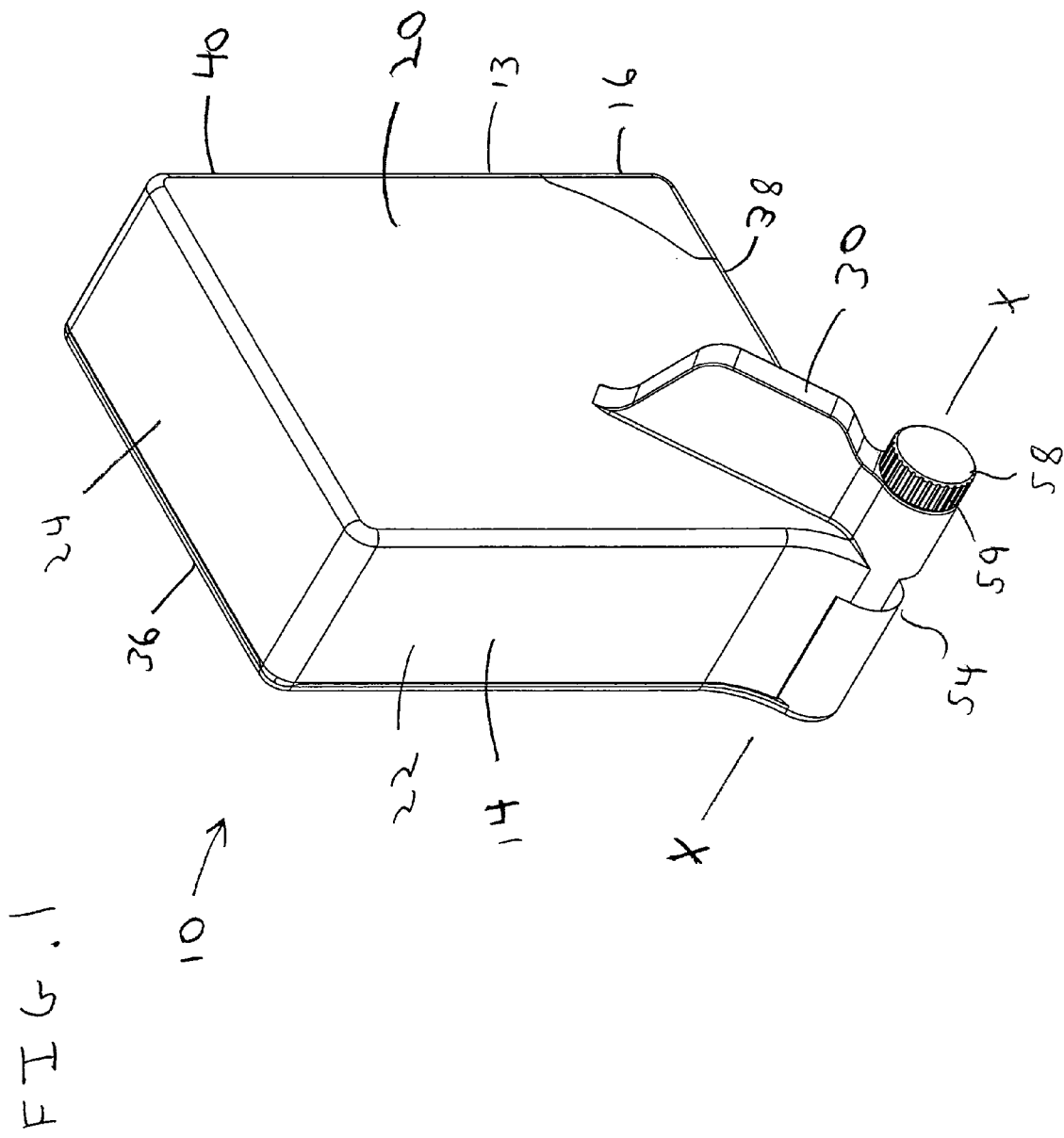
FIG. 1 is a perspective view of the receptacle of the present invention.

With reference to FIGS. 1 and 4, the present invention includes a receptacle 10 for supporting a wireless device capable of emitting electromagnetic waves such as RF signals. The receptacle 10 includes a closed position wherein the device 12 is covered by the receptacle, thereby isolating the device, and an open position wherein the device is uncovered by the receptacle 10. The receptacle is preferably able to shield electromagnetic signals. Therefore, when the receptacle is in the closed position, signals in or out of the receptacle are restricted.

In a preferred embodiment, receptacle 10 accommodates a wireless device 12 in the form of a transponder. The transponder 12 may be an RFID-type transponder which emits an RF signal in response to an interrogation signal. The wireless device 12 may be a toll payment device typically used in electronic toll collection systems. The payment device may be a transponder that communicates with an interrogation device located at the toll plaza which reads the signal generated by the transponder. It is also within the contemplation of the present invention that the receptacle 10 could contain other types of devices which emit and/or receive electronic signals. Receptacle 10 preferably includes RF shielding such that when the receptacle 10 is in the closed position the transponder is shielded from RF signals and rendered inoperable. When the receptacle 10 is in the open position, the transponder 12 is able to receive and transmit electronic signals such as RF signals and is rendered operable.

Figure 3:
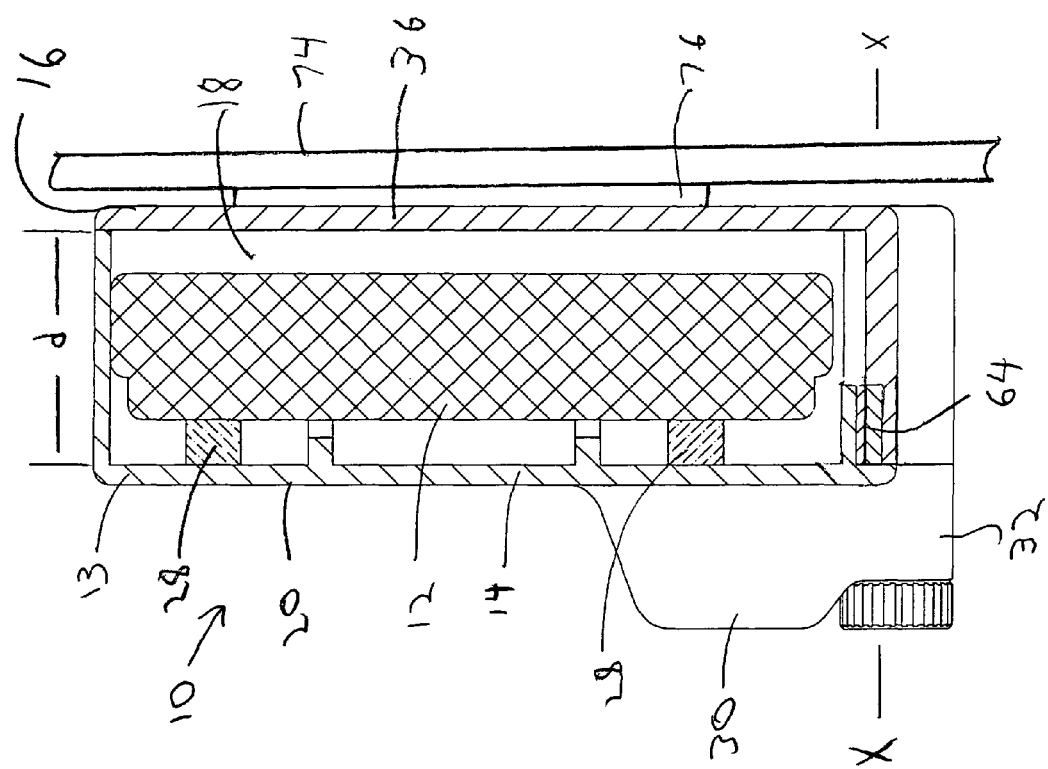
FIG. 3 is a side cross-sectional view taken along line 3-3 of FIG. 2.

With reference to FIGS. 1, 3 and 4, receptacle 10 may include a housing 13 including a first housing portion 14 which is pivotally secured to a second housing portion 16. First housing portion 14 is movable between an open and closed position. When the first housing portion 14 is moved to the closed position, the first housing portion 14 and second housing portion 16 are brought together, thereby forming an enclosed chamber 18 for holding transponder 12. The chamber 18 is preferably completely surrounded by the housing 13.

Figure 2:
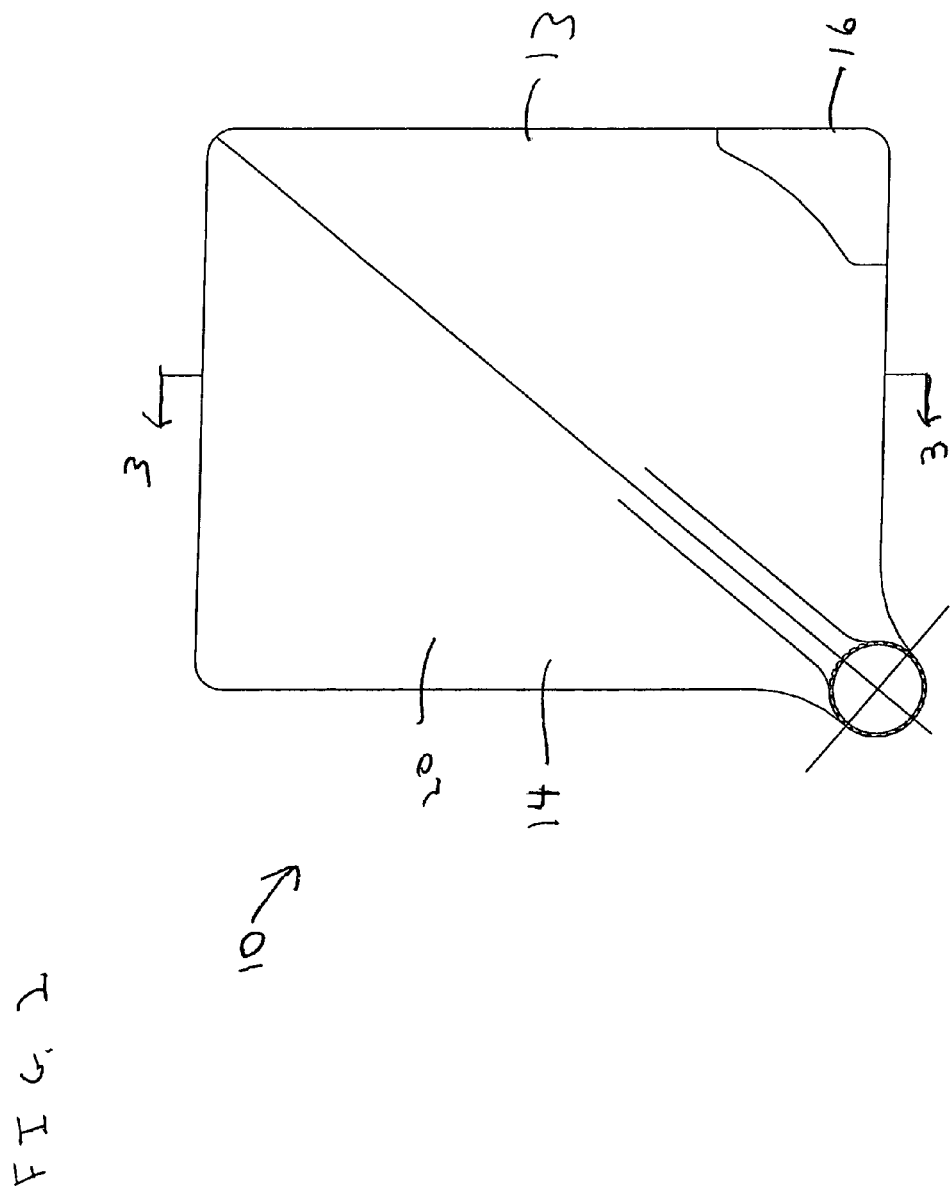
FIG. 2 is a front elevational view of the receptacle of FIG. 1.

Referring additionally to FIGS. 2, 3 and 7, the first housing portion 14 includes a first side wall 20 which may be generally planar and have a generally rectangular shape. It is within the contemplation of the present invention that the first housing portion could be formed in a variety of shapes and may correspond generally to the shape of the transponder. First side wall 20 may include a plurality of ribs 21 for strengthening the wall. Bounding two adjacent sides of the first side wall 20 are a first perimeter wall 22 and a second perimeter wall 24. The first 22 and second 24 perimeter walls extend from base wall 20 in a generally orthogonal manner. First side wall 20 and first and second perimeter walls 22 and 24 form a recess 26 in which the transponder 12 may be supported. An attachment device 28 (FIG. 3) secures the transponder 12 to the first housing portion 14. The attachment device may include one or more segments of double sided adhesive tape or a hook and loop fastener, adhesive, clip, or other type of attachment device in order to secure the transponder 12 to first housing portion 14. Accordingly, the first housing portion 14 and transponder 12 are fixed together such that movement of the first housing portion 14 results in movement of the transponder 12. First housing portion 14 may preferably be formed of a plastic material.

First housing portion 14 may also include an outwardly extending tab 30 in order to provide a gripping surface for a user to rotate the first housing portion 14. First housing portion 14 may further include a hinge member 32 including an opening 34 there-through in order to permit to be pivotally secured to the second housing portion in a manner described below. Hinge member 32 may extend outwardly from base wall 20 adjacent a corner thereof. Alternate locations of the hinge member 32 are within the contemplation of the present invention. Hinge member 32 may be integrally formed with first housing portion 14.

Figure 9B:
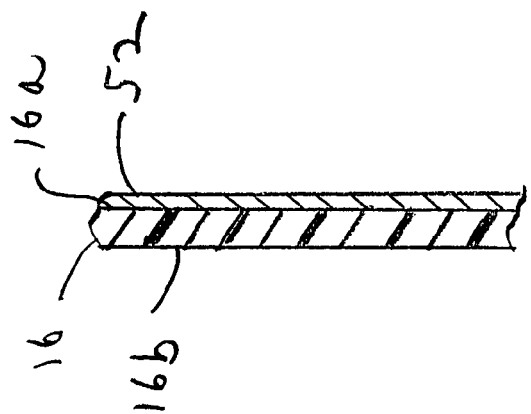
FIG. 9B is a detailed cross-sectional view of a portion of the second housing portion
Figure 9A:
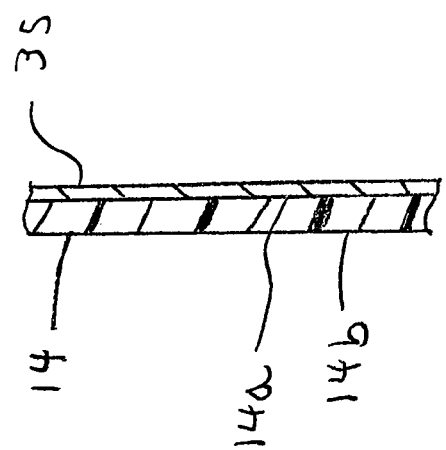
FIG. 9A is a detailed cross-sectional view of a portion of the first housing portion.

With reference to FIGS. 7 and 9A, first housing portion 14 may include a shield 35. The shield 35 may block or significantly attenuate electromagnetic signals and preferably RF signals. In a preferred embodiment, shield 35 may include a thin metallic layer disposed on the inner surface 14a of the first housing portion 14 including over the first side wall 20 and first 22 and second 24 perimeter walls. The layer may be applied as a foil or as a coating to the entire inner surface. Alternatively, the metallic layer may be disposed on the outer surface 14b of the first housing portion. Preferably, the shield covers the entire first housing portion. The amount of housing surface covered by the shield may be varied depending on the degree of signal attenuation desired. In a further alternative embodiment, the shield may be integral with the material used to form the first housing portion 14. For example, the first housing portion may be formed of metal or a plastic having electromagnetic signal shielding abilities.

With reference to FIGS. 4 and 8, the second housing portion 16 may include a generally planar second side wall 36. Second wall 36 may have a configuration that generally corresponds to first side wall 20. It is within the contemplation of the present invention that the shape of second side wall 36 may be varied as desired to accommodate the shape of the transponder. Extending outwardly from and along two edges of second wall 36 is a third perimeter wall 38 and fourth perimeter wall 40. The second wall 36 and third and fourth perimeter walls, 38 and 40, form a second recess 42 which is adapted to receive the transponder 12 when first housing portion 14 is moved into a closed position. In a preferred embodiment, the third 38 and fourth 40 perimeter walls may be connected by a tab 44 extending there-between. Tab 44 corresponds to notch 46 formed on the corner of first side wall 20. Notch 46 may include a stepped rim 48 which is positioned behind tab 44 when first housing portion 14 is in the closed position (FIG. 1). The cooperation between the notch 46 and tab 44 helps to align the first housing portion 14 with respect to second housing portion 16 when in the closed position. It is within the contemplation of the present invention that housing 13 may be formed without the tab and notch.

Second housing portion 16 may include a hinge member 50 having a hinge opening 51. Hinge member 50 may extend from second side wall 36 along the edge of third perimeter wall 38 such that hinge member 50 is located adjacent a corner of second housing portion 16. It is within the contemplation of the present invention that the hinge member 50 could be positioned at a location other than adjacent a corner, such as in between the corners. Second housing member 16 may be formed of a plastic material.

Referring to FIG. 9B, second housing portion 16 may include a shield 52 to prevent the transmission or significantly attenuate RF signals in a manner similar to shield 35 of the first housing portion 14. Accordingly, shield 52 may preferably include a thin metallic layer disposed on the inner surface 16a of the second housing portion 16 including the second wall 36 and the third 38 and fourth 40 parameter walls. Alternatively, the metallic layer may be disposed on the outer surface. Preferably, the shield covers the entire second housing portion 16. The amount of housing surface covered by the shield may be varied depending on the degree of signal attenuation desired. In a further alternative embodiment, the shield may be formed integrally with the material used to form the second housing portion 16. For example, the second housing portion may be formed of metal or a plastic having electromagnetic signal shielding abilities.

Referring to FIGS. 1 and 3, when the receptacle 10 is in the closed position, the first 14 and second 16 housing portions are spaced from each other a distance "d" sufficient to accommodate the thickness of the transponder 12. This distance is maintained as the receptacle 10 is actuated to the open position upon rotation of first housing portion 14. In the closed position, the first 20 and second 36 side walls form the sides of the receptacle and the first 22, second 24, third 38 and fourth 40 perimeter walls form the edges of the receptacle 10. These walls, which include the shields 35 and 52, completely surround the transponder 12 and isolate it from the surroundings. The shields 35 and 52 preferably cooperate to surround the transponder 12 such that RF signals in or out of the housing 13 are restricted.

With reference to FIGS. 1, 4 and 6, the first housing portion 14 rotates relative to the second housing portion 16 about an axis X-X. This axis is preferably perpendicular to a plane in which the first side wall 20 and transponder 12 lie. When the receptacle housing 13 is in the closed-position, the first side wall 20 and second side wall 36 are spaced from each other the distance, d, (FIG. 3) sufficient to accommodate the thickness of the transponder 12. The distance d runs generally along the axis of rotation X-X-. Upon rotation of the first housing portion 14 this distance remains the same. The first portion swings away from the second housing portion 16 extending therefrom in a direction generally perpendicular to the axis of rotation.

In order to achieve such rotation, the first housing portion 14 and second housing portion 16 may be connected together by a hinge 54. Hinge 54 preferably includes a post 56 which extends between the hinge openings 34 and 51 of the first housing portion 14 and second housing portion 16 respectively. A first post end 56a may be fixedly secured in the second housing portion 16 and a second post end 56b extends through the hinge opening 34 of first housing portion 14. The second post end 56b may include an internal thread 55 to which a fastener 58 may be attached in order to retain the first housing portion 14 onto the second housing portion 16. The fastener 58 may include a knurled surface 59 which allows a user to tighten the fastener to the post 56. It is within the contemplation of the present invention that other fastening devices may be used.

With reference to FIGS. 4, 7 and 8, receptacle 10 may include a stop 60 which limits the rotation of the first housing portion 14 with respect to the second housing portion 16. In the preferred embodiment, the first housing portion 14 may be rotated relative the second housing portion 16 approximately 90 degrees between the closed and open position. The stop 60 position helps maintain the first housing portion 14 in the open position as shown in FIGS. 4 and 5. It is within the contemplation of the present invention that the stop could be configured to permit other degrees of rotation. The stop 60 may include a semicircular protrusion 62 extending from the corner of the first housing portion 14 adjacent hinge opening 34. A second semicircular structure 63 may be formed on the second housing portion 16 adjacent hinge opening 51. When the first housing portion 14 is rotated, the semicircular portions engage each other once the first housing portion has been moved fully to the open position.

Referring to FIGS. 3 and 6, in order to maintain the first housing portion 14 in the closed position, the present invention may include a retainer 64. Retainer 64 may releasably secure the first housing portion 14 in the closed position and permit the first housing portion to be rotated to the open position when desired. In a preferred embodiment, retainer 64 may include a magnetic attraction between the first housing portion 14 and second housing portion 16. A flange 66 extending outwardly from the first side wall 20 may include a first magnet 68. The second housing portion 16 may include a depression 70 formed in third peripheral wall 38 to receive a second magnet 72. When the first housing portion 14 is moved into the closed position, the first and second magnets 68 and 72 attract each other, thereby holding the first housing portion 14 in the closed position. In an alternative embodiment, only one magnet on either the first 14 or second 16 housing portion may be used, and it may attach to the metallic shield on the other housing portion. The magnet may be located at different location on the housing portion. It is within the contemplation of the present invention that the retainer 64 could include alternative connecting or latching mechanisms in order to selectively retain the first housing portion in the closed position.

Referring to FIG. 3, in a preferred embodiment, receptacle 10 may be secured to a support structure 74, for example, a vehicle's windshield. Alternatively, the second housing portion 16 may be secured to a vehicle's sun visor or headliner. A securement device 76 may be employed to secure the second housing portion 16 to the vehicle. Securement device 76 may extend between second wall outer surface 78 and the support structure 74. The securement device 76 may be in the form of two sided tape or hook and loop fastener or other known types of mechanical or adhesive attachment devices. With the second housing portion fixed with respect to the vehicle, rotation of the first housing portion 14 causes the housing to open as shown in FIGS. 4 and 5. The transponder 12, which moves with the first housing portion 14, is thereby moved out of chamber 18 and exposed at a position adjacent the windshield. The transponder 12 may then receive and/or emit signals.

In an alternative preferred embodiment, the hinge may include a retaining mechanism for releasably-securing the first housing portion in an open and closed position. In a preferred embodiment, the retaining mechanism may include a detent mechanism such that the first housing portion will be maintained in the open position. With reference to FIGS. 11-13, receptacle 100 may be formed similarly to receptacle 10 described above, except for the addition of a detent mechanism 102. Detent mechanism 102 may include a first detent member 104 formed in hinge shaft 106. The hinge shaft 106 is preferably fixed to and extends from second housing portion 107. The first housing portion 108 may include a hinge member 110 having a second detent member 112 supported thereon. Hinge member 110 may include a recess 114 formed therein which communicates with a hinge opening 116. The hinge opening is sized to receive the hinge shaft 106 therethrough. The first housing portion 108 may be rotatably retained on the second housing portion 107 by a fastener 117 which may be threaded to shaft 106. The second detent member 112 is disposed in the recess 114. A cap 118 may be placed over the recess to retain the second detent member 104 in the recess 114. When the first housing portion 108 is rotated to the open position, the first detent member 104 and second detent member 112 engage each other, thereby securing the first housing portion 108 in the open position. A user may overcome the engagement by urging the first housing portion toward the closed position.

In a preferred embodiment, first detent member 104 may include a radially extending first depression 120, such as a hole, formed in hinge shaft 106. The hole may be formed by cross drilling shaft 106. The second detent member 112 may include a rounded member 122, such as a metal ball, and a biasing device 124 which tend to urge the rounded member 122 toward the hinge shaft when the first housing member 108 is inserted thereon. In the open position, the rounded member 122 sits within the first depression 120, and the biasing member maintains the rounded member therein. The first housing portion 108, therefore, is retained in the open position. When a user wishes to close the receptacle 100, the first housing member 108 may be urged toward the closed position. The rounded member 122 is thereby moved out of the first depression 120 and the first housing member is free to rotate.

The shaft may include a second depression 126 which aligns with the rounded member 122 when the first housing portion 108 is in the closed position. Second depression may be formed in a manner similar to first depression 120. Rounded member extends into the second depression 126 to retain the position of the first housing portion 108 relative to the second housing portion 107. Therefore, the detent mechanism 102 maintains the first housing portion 108 in the closed position.

The detent mechanism 102 permits the receptacle 100 to be installed in different orientations, and the receptacle will remain in the desired open or closed position. For example, as shown in FIG. 13, the receptacle 100 may be mounted on a windshield below a rearview mirror 130. The first housing member 108 may then be rotated upwardly to the open position exposing the transponder 12. The transponder 12 will remain exposed until a user urges the first housing member 108 to the closed position.

With the detent mechanism 102 securing the receptacle in the closed position, a magnetic element, as described above, is not necessary. However, it is within the contemplation of the present invention, that a magnetic retainer or other closure elements may be used to maintain the receptacle in the closed position.

Operation of the receptacle will now be described with reference to the embodiment as shown in FIGS. 1-9B. The operation of the embodiment shown in FIGS. 11-13 would be substantially the same. When the first housing portion 14 is in the closed position, the first and second side wall are brought into opposed alignment and the third and fourth perimeter walls are brought together forming the chamber 18 which is bounded on both sides and along the perimeter. Chamber 18 is preferably entirely surrounded by shielding which attenuates or completely prevents the transmission of electromagnetic signals, and in particular RF signals. Accordingly, when the transponder 12 is used in a toll collection system 82 (FIG. 10), if a driver desires not to rely on the transponder 12 to pay a toll, the receptacle 10 may be left in the closed position (FIG. 1) wherein the transponder 12 is isolated from an interrogation device 80 in an automatic toll payment system 82.

When one desires to expose the transponder to RF signals, such as when a driver desires to rely on the transponder to pay a toll, the driver may engage the receptacle first housing portion 14 and rotate it to the open position as shown in FIG. 4. FIG. 13 shows the receptacle 100 of the alternative embodiment in the open position. In the open position, the transponder 12 is exposed and free of shielding material along its broad front face as well as along two of edges as shown in FIGS. 4 and 5. This presents a significant amount of surface area exposed to interrogation by RF signals 84 emitted by the interrogation device 80. The transponder 12 may then emit a signal 86 in response. Therefore, an RF interrogator 80 such as in automatic toll-pay systems will detect the transponder and the transponder can respond in kind. With the second housing portion 16 secured to the vehicle such that the transponder 12 in the open position faces the windshield; the transponder may interact with the automatic toll paying system.

Various changes to the foregoing described and shown structures would now be evident to those skilled in the art. Accordingly, the particularly disclosed scope of the invention is set forth in the following claims.

What is claimed is:

1. A receptacle for retaining an automatic toll payment device on or adjacent to a vehicle windshield comprising:
a housing including a first portion fixedly securable to the payment device and a second portion being fixedly securable to the vehicle on, or adjacent to, the vehicle windshield, the first portion being rotatably secured to the second portion, the first and second portion forming a chamber for enclosing the payment device when the first portion is in a closed position, the first and second housing portions each including a shield for restricting the transmission of signals to or from the payment device when the first housing portion is in the closed position and permitting the transmission of signals when the first housing portion is in an open position, wherein when the housing is in the open position, the payment device is positionable to face the windshield, and a space between the payment device and the windshield is substantially unobstructed by the housing.

2. The receptacle as defined in claim 1, wherein the first housing portion includes a first recess for accommodating the wireless device and the second housing portion includes a second recess, the first and second recesses forming the chamber when the first housing portion is in the first position.

3. The receptacle as defined in claim 1, wherein the first housing portion includes a first planar wall bounded along adjacent edges by a first and second perimeter wall.

4. The receptacle as defined in claim 3, wherein the first housing portion is rotatable about an axis X-X.

5. The receptacle as defined in claim 4, wherein the first planar wall lies in a plane substantially perpendicular to the axis X-X.

6. The receptacle as defined in claim 3, wherein the second housing portion includes a second planar wall bounded along adjacent edges by a third and fourth perimeter wall.

7. The receptacle as defined in claim 1, wherein the chamber is fully enclosed and surrounded by the housing, wherein the toll payment device is disposed within the chamber is fully enclosed by the shield of the first and second housing portions.

8. The receptacle as defined in claim 1, wherein the first and second housing portions are connected by a hinge, and wherein the first housing portion includes a first wall and the second housing portion includes a second wall, the first and second walls being in opposed spaced relation when the first housing portion is in the first position to form the chamber, and wherein the first wall and second walls remain substantially parallel to each other when the first housing portion is pivoted about the hinge relative to the second housing portion.

9. The receptacle as defined in claim 1, wherein the shield of the first and second housing portions includes a layer of metallic material disposed on the housing.

10. The receptacle as defined in claim 9, wherein the metallic layer is supported on either of an inside or outside surface of the housing.

11. The receptacle as defined in claim 1, further including an attachment device for fixedly securing the second housing portion to the support structure.

12. The receptacle as defined in claim 1, wherein the first housing portion is adapted to be fixedly secured to the toll payment device wherein movement of the first housing portion causes movement of the wireless device.

13. The receptacle as defined in claim 1, further including a detent mechanism for maintaining the first housing portion in the second position.

14. The receptacle as defined in claim 13, wherein the detent mechanism includes a biased device supported on the first housing member and a depression supported on the second housing member.

15. A receptacle for retaining an automatic toll payment device on a vehicle comprising:
a housing including a first portion fixedly securable to the payment device and a second portion being fixedly securable to the vehicle, the first portion rotatably secured to the second portion, the first and second portion forming a chamber for enclosing the payment device when the first portion is in a closed position, the first and second housing portions each including a shield for restricting the transmission of signals to or from the payment device when the first housing portion is in the closed position and permitting the transmission of signals when the first housing portion is in an open position, and the first housing portion including a first side wall and the second housing portion including a second side wall, the first and second side walls being in opposed spaced relation forming the chamber when the first portion is in the closed position and wherein the first portion rotates relative to the second portion about an axis of rotation, and the first and second side walls are spaced from each other a distance, d, extending generally along the axis of rotation, and wherein the distance, d, remains substantially the same when the first portion is rotated relative to the second portion.

16. The receptacle as defined in claim 15, wherein the first portion includes a first and second peripheral wall extending from the first side wall, the first and second peripheral walls and first side wall surrounding three sides of the payment device when in the open and closed positions.

17. The receptacle as defined in claim 16, wherein the second portion includes a second side wall and third and fourth perimeter walls, the second side wall and third and fourth perimeter walls surrounding three sides of the payment device when the first housing portion is in the opened and closed positions.

18. The receptacle as defined in claim 15, further including a retainer for releasably securing the first housing portion in the closed position.

19. The receptacle as defined in claim 15, further including a hinge for rotatably securing the first housing portion to the second housing portion and wherein the hinge includes a stop for limiting a degree of movement of the first housing portion.

20. The receptacle as defined in claim 15, wherein the first housing portion extends outwardly beyond the second housing portion when the first portion is in the open position.

21. The receptacle of claim 15, further including a detent mechanism for maintaining the first housing portion in the open position.

22. A method of affecting the operability of a toll payment device including the steps of:
providing a housing including a first portion and a second portion, the first portion being rotatably secured to the second portion, the first and second portions forming a chamber for enclosing the payment device when the first portion is in a closed position, the first and second housing portions including a shield, the shield restricting the transmission of signals to or from the payment device when the first portion is in the closed position;
securing the second housing portion to a vehicle;
securing the payment device to the first housing portion;
rotating the first housing portion to a closed position to prevent operation of the payment device; and
rotating the first housing portion to an open position to open the chamber and permit operation of the payment device, wherein when the housing is in the open position, the payment device is positionable to face a windshield of the vehicle, and a space between the payment device and the windshield is substantially unobstructed by the housing.

23. A receptacle for supporting a wireless device on a support structure comprising:
a housing including a first housing portion securable to the wireless device and a second housing portion being securable to the support structure, the first housing portion being pivotally secured to the second housing portion, the first housing portion and second housing portion each including a shield for attenuating the transmission of electromagnetic signals; and
the first housing portion having a first position wherein the first housing portion and second housing portion form a chamber for enclosing the wireless device and restricting the transmission of electromagnetic signals from the chamber, the first housing portion having a second position wherein the first housing portion is displaced from the second housing portion thereby opening the chamber and exposing the wireless device to permit the transmission of electromagnetic signals to and from the wireless device, and wherein the first and second housing portions are connected by a hinge, and wherein the first housing portion includes a first wall and the second housing portion includes a second wall, the first and second walls being in opposed spaced relation when the first housing portion is in the first position to form the chamber, and wherein the first wall and second walls remain substantially parallel to each other when the first housing portion is pivoted about the hinge relative to the second housing portion.

* * * * *